(12) United States Patent
Bucquet et al.

(10) Patent No.: US 8,186,918 B2
(45) Date of Patent: *May 29, 2012

(54) RESIN ANCHOR WITH A COMPRESSIBLE ENVELOPE CONTAINING CURABLE PRODUCTS, AT LEAST ONE OF WHICH IS SACHETED

(75) Inventors: Barbara Bucquet, Valence (FR); Alain Gauthier, Saint Jean de Muzols (FR); Gilles Caille, Paris (FR)

(73) Assignee: Societe de Prospection et d'Inventions Techiques Spit, Bourg-les-Valence (FR)

( * ) Notice: Subject to any disclaimer, the term of this patent is extended or adjusted under 35 U.S.C. 154(b) by 646 days.

This patent is subject to a terminal disclaimer.

(21) Appl. No.: 12/307,935

(22) PCT Filed: Jul. 11, 2007

(86) PCT No.: PCT/IB2007/001947
§ 371 (c)(1),
(2), (4) Date: Jan. 8, 2009

(87) PCT Pub. No.: WO2008/010050
PCT Pub. Date: Jan. 24, 2008

(65) Prior Publication Data
US 2009/0311067 A1 Dec. 17, 2009

(30) Foreign Application Priority Data
Jul. 12, 2006 (FR) ...................... 06 06358

(51) Int. Cl.
*F16B 13/14* (2006.01)
(52) U.S. Cl. .............. 411/38; 411/82; 411/80.5

(58) Field of Classification Search ............... 411/82, 411/82.3, 258, 930, 34, 38, 62, 80.1, 80.5, 411/80.6
See application file for complete search history.

(56) References Cited

U.S. PATENT DOCUMENTS 3,723,215 A * 3/1973 Kessler .................... 156/92
3,772,957 A * 11/1973 Newton .................... 411/15
(Continued)

FOREIGN PATENT DOCUMENTS
DE 10010473 A1 9/2001
(Continued)

OTHER PUBLICATIONS

ISR for PCT/IP2007/001947 dated Dec. 20, 2007.

*Primary Examiner* — Flemming Saether
(74) *Attorney, Agent, or Firm* — Lowe Hauptman Ham & Berner LLP

(57) ABSTRACT

The resin anchor comprises an apertured tubular envelope designed to be compressed by a traction element, characterized in that it includes, on the inside of the envelope, a resin component and a hardener component that are intended to be mixed together and to cure under the action of the compression of the envelope (1), in order to fasten the anchor, at least one of the two components being sacheted, the mix formed from the two components being expelled out of the envelope via its apertures, during its compression. The traction element may be a screw that cooperates with the end element of the bushing CD forming a nut. The anchor is fastened both mechanically and chemically, for either solid material or hollow material.

5 Claims, 2 Drawing Sheets

U.S. PATENT DOCUMENTS

| | | | | |
|---|---|---|---|---|
| 4,475,329 A | * | 10/1984 | Fischer | 52/704 |
| 4,514,125 A | * | 4/1985 | Stol | 411/82.3 |
| 4,555,206 A | * | 11/1985 | Sweeney | 411/23 |
| 4,659,268 A | * | 4/1987 | Del Mundo et al. | 411/34 |
| 5,725,341 A | * | 3/1998 | Hofmeister | 411/32 |
| 5,730,557 A | * | 3/1998 | Skupien et al. | 405/259.6 |
| 6,468,010 B2 | * | 10/2002 | Sager et al. | 411/82 |
| 6,837,658 B2 | * | 1/2005 | Nehl | 411/36 |
| 6,905,295 B2 | * | 6/2005 | Stevenson et al. | 411/34 |
| 7,708,500 B2 | * | 5/2010 | Buquet et al. | 405/259.6 |

FOREIGN PATENT DOCUMENTS

| | | |
|---|---|---|
| FR | 2776722 A1 | 10/1999 |
| GB | 1425852 A | 2/1976 |

\* cited by examiner

RESIN ANCHOR WITH A COMPRESSIBLE ENVELOPE CONTAINING CURABLE PRODUCTS, AT LEAST ONE OF WHICH IS SACHETED

RELATED APPLICATIONS

The present application is based on International Application Number PCT/IB2007/001947 filed Jul. 11, 2007, and claims priority from, French Application Number 0606358 filed Jul. 12, 2006, the disclosures of which are hereby incorporated by reference herein in their entirety.

TECHNICAL FIELD

The present invention relates to resin anchors, that is to say anchors that are fastened to a support material by means of resin and a hardener for curing the resin.

BACKGROUND

Resin anchors exist for solid materials and for hollow materials.

In a solid material, a hole may be: drilled and a resin capsule, in which a stick of hardener is embedded, may be slipped thereinto, before the combination is crushed and the two components mixed together. It is also possible to drill a hole and inject resin and a hardener thereinto, the resin and hardener mixing together. A threaded rod or a screw may serve as fastening element.

In a hollow, material, after a hole has been drilled in the wall of the material, a tubular screen may be introduced into said hole, resin and a hardener then being injected into said screen, and the resin, expelled out of the screen and after curing, fastening the screen to the rear of the wall. Threaded rods or screws may also be used as fastening elements.

All the abovementioned anchors may be used both in a solid material and in a hollow material.

Also known, for a hollow material, is an element with a bearing flange to which a slit skirt is firmly attached, the skirt being designed, i) to be pressed against the rear face of the wall through the action of the tie connecting it to the flange that bears against the front face of the wall and ii) to receive, by injection, a resin/hardener mix for fastening the element to the rear of the wall.

All the abovementioned anchors, which have been known for a long time, are fastened by purely chemical means.

Many of these resin anchors require a resin injection step to be carried out, and the Applicant has sought to dispense with this relatively tedious injection operation. In addition, the Applicant has sought to provide a resin anchor that is not only suitable both for a hollow material and a solid material but that is able to be fastened no longer by purely chemical means but also by mechanical means.

Thus, what it proposes is a resin anchor, comprising an apertured tubular envelope designed to be compressed by a traction element, characterized in that it includes, on the inside of the envelope, a resin component and a hardener component that are intended to be mixed together and to cure under the action of the compression of the envelope, in order to fasten the anchor, at least one of the two components being sacheted, the mix formed from the two components being expelled out of the envelope via its apertures during its compression.

It should be emphasized that nothing could have encouraged a person skilled, in the art to put, into a resin anchor also having mechanical fastening, thanks to the compression of the compressible envelope, and usable both in a hollow material and a solid material, two components intended to be cured as was done in a hole of a solid material for receiving a fastening element of the threaded rod or tapped bushing type.

SUMMARY

In the first embodiments of the anchor of the invention, the two components are sacheted, for example in two sachets fixed together, or one in a sachet, for example the resin, and the other, the hardener, in a capsule.

In other embodiments of the anchor of the invention, only one of the components is sacheted—a priori this will be the hardener component—and the apertures in the tubular envelope are obstructed by retaining membranes that can be torn off under the action of the compression of the envelope. In this case, the hardener component is placed in a rod or capsule embedded in the resin.

BRIEF DESCRIPTION OF THE DRAWINGS

The invention will be more clearly understood with the aid of the following description of several embodiments of the anchor, with reference to the appended drawing in which.

DETAILED DESCRIPTION

Figure 1:
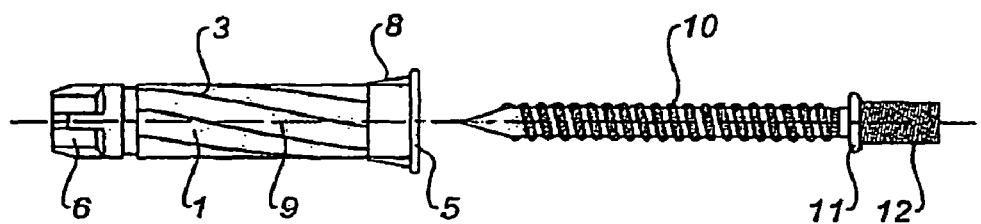
FIG. 1 is a side view of a first embodiment of the anchor of the invention with its compression/fastening screw.
Figure 2:
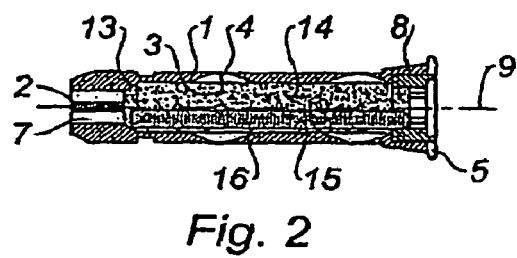
FIG. 2 is a view in axial section of the anchor of FIG. 1.
Figure 5:
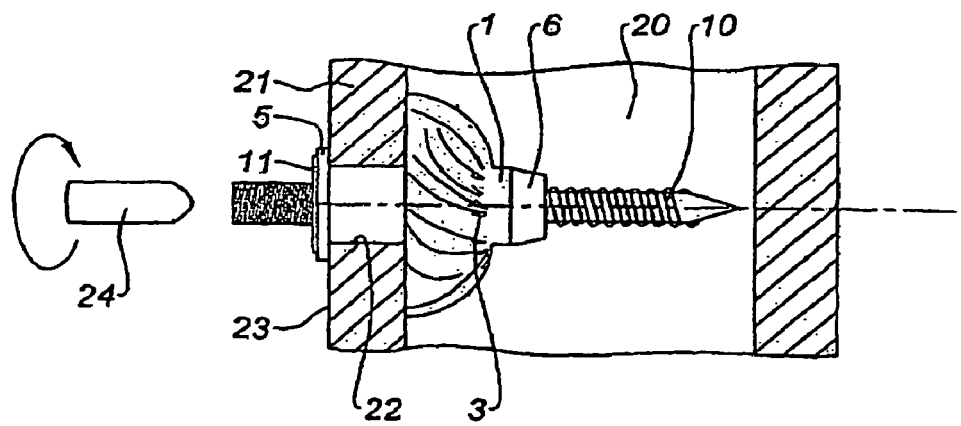
FIG. 5 is a view in axial section of the anchor of the invention, after fastening.

With reference to FIGS. 1-2 relating to the first embodiment and to FIG. 5, the anchor comprises a bushing 1, here made of plastic, of axis 9.

The bushing 1 extends between a bearing flange 5 and another end 6 on the opposite side from that of the flange and forming traction nut 7, as will be explained later, thanks to axial internal ribs 2, here there are four ribs, projecting inside this thicker wall end 6, forming a small chamfered internal shoulder 13.

The tubular envelope of the bushing is apertured by helical slits 3 extending over most of the axial length of the bushing, between the bearing flange 5 and end 6. These slits are obstructed by tearable retaining membranes A, coming from the same mould.

The bushing part adjacent to the flange 5 also has a thicker wall, through the outside of which antirotation ribs 8 extend.

The bushing 1 of the anchor is intended to be put into compression by a traction screw 10 (which here is also a fastening screw) intended to engage on the ribs 2 of the nut part 7 of the end 6 of the bushing.

The screw 10 includes an intermediate flange 11 beyond which a threaded end portion 12 extends, said end portion 12 being intended to receive a part to be fastened to the screw 10 by a hut to be screwed onto this threaded portion 12. When the flange 11 of the screw bears against the flange 5 of the bushing and when the screw is rotated into the nut part 7 of the bushing by means of a screwing end-piece of a suitable tool, the end 6 of the bushing is pulled towards the flanges, that is to say the tubular envelope of the bushing is compressed. This is why the screw 10 is termed a traction element.

The inside, of the bushing includes the two curable components and is filled with resin 14, which is retained by the membranes 4 and In which a rod 16 of hardener 15 is embedded, being easily destroyable and extending axially and able to bear on the internal shoulder 13.

Having described the resin anchor in terms of its various elements, we will now deal with its use, here in a hollow material 20 with an outer wall 21.

After a hole 22 has been drilled into the wall 21 with a diameter very slightly larger than the outside diameter of the envelope of the bushing 1, the anchor is introduced into the hole 22 as far as the point when the flange 5 of the bushing bears against the external surface 23 of the wail 21. The screw 10 is then rotated, using a tool with a screwing bit 24. The traction end 6 of the bushing 1 is pulled back along the screw 10, thereby compressing the envelope of the bushing 1, causing it to expand, and creating a "lump" at the rear of the wall 21, so as already to mechanically fasten the anchor to the wall 21.

Concomitantly, the compression of the envelope causes i) the destruction of the rod 16 of hardener 15 and the mixing of the two components and ii) the tearing of the retaining membranes 4. During compression of the envelope of the bushing, the mix is partly expelled via the apertures made up of slits 3 in order to form, at the rear of the wall 21, a substance that will cure in order to achieve, by chemical means, perfect fastening of the anchor to the wall 21.

Figure 3:
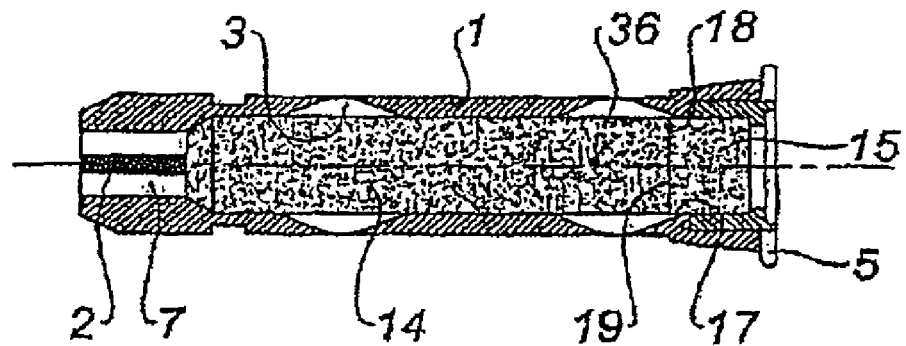
FIG. 3 is a view in axial section of a second embodiment of the anchor of the invention.

The embodiment shown in FIG. 3 differs from that of FIGS. 1 and 2, where the same references denote the same means, by the fact that resin 14 is also sacheted in a tearable pouch 36 and the hardener 15 is sacheted in another tearable pouch 17, the two pouches being housed inside the envelope 1, side by side along the axis 9 and fastened together via their adjacent sides 18, 19, purely for convenience. In this embodiment, the slits 3 do not need to be obstructed by membranes for retaining the resin, since the resin is sacheted. Otherwise, the retaining membranes 4 would have to be kept.

Figure 4:
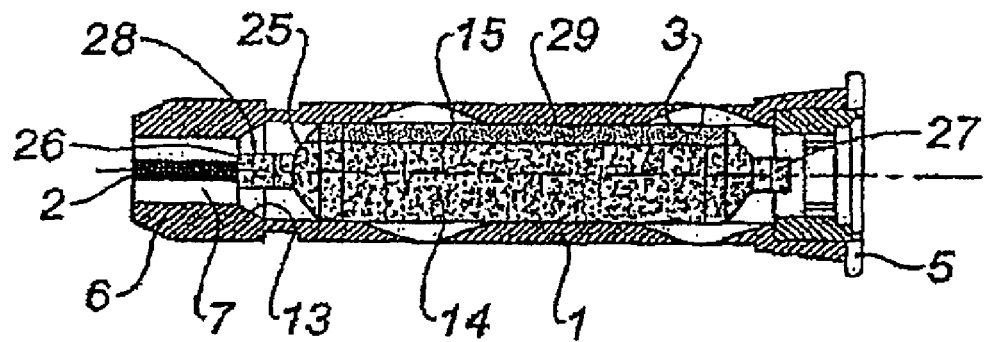
FIG. 4 is a view in axial section of a third embodiment of the anchor of the invention.

The embodiment shown in FIG. 4 is quite similar to that shown in FIG. 3.

The resin 14 is sacheted in a tearable oblong sachet 25 bearing on a transverse wall 26, which is likewise easily destroyable, which separates the thin-wall tubular portion of the envelope of the bushing from the nut end part 6, 7 at the chamfered shoulder 13.

The sachet 25 narrows down at its two ends and is obstructed by two small plugs 27, 28. The hardener 15 is placed in an easily destroyable rod 29, which also extends axially alongside the resin sachet 25. In this example, the slits 3 again do not need to be obstructed by a retaining membrane Of course, the use of the embodiments shown in FIGS. 3 and 4 is identical to that of the first embodiment and is also illustrated by FIG. 5.

The invention claimed is:

1. As resin anchor, comprising:
   a tubular envelope having a first end and a second end, and a bore extending along an axial length through said tubular envelope from said first end to said second end;
   a traction nut integrally formed on an outer portion of said second end;
   a plurality of helical slits disposed on an outer surface of said tubular envelope and extending substantially over said axial length of said tubular envelope;
   a traction screw having a plurality of outer threads engageable with said traction nut;
   a rod containing a hardener material and a plurality membranes containing a resin disposed within said tubular envelope, wherein said plurality of membranes are disposed adjacent said plurality of slits, wherein
   the rotation of said rod causing said tubular envelope to compress and collapse thereby breaking said hardener rod and tearing open said resin membranes causing said resin and said hardener to mix and expel through the plurality of slits and cure to chemically secure the resin anchor to a component.

2. The resin anchor of claim 1, wherein said nut includes axial internal ribs.

3. As resin anchor, comprising:
   a tubular envelope having a first end and a second end, and a bore extending along an axial length through said tubular envelope from said first end to said second end;
   a traction nut integrally formed on an outer portion of said second end;
   a plurality of helical slits disposed on an outer surface of said tubular envelope and extending substantially over said axial length of said tubular envelope;
   a traction screw having a plurality of outer threads engageable with said traction nut;
   a first tearable pouch containing a hardener material and a second tearable pouch containing a resin disposed within said tubular envelope; wherein,
   the rotation of said cod causing said tubular envelope to compress and collapse tearing open said first tearable pouch and said second tearable pouch causing said resin and said hardener to mix and expel through the plurality of slits and cure to chemically secure the resin anchor to a component.

4. The resin anchor of claim 3, wherein the two pouches that are fixed together.

5. The resin anchor of claim 3, wherein said nut includes axial internal ribs.

* * * * *